H. S. DICKINSON.
TILLAGE IMPLEMENT.
APPLICATION FILED DEC. 9, 1919.

1,428,947.

Patented Sept. 12, 1922.
4 SHEETS—SHEET 2

Fig. 2.

Witness:
Harry S. Gaither

Inventor:
Harry S. Dickinson

Patented Sept. 12, 1922.

1,428,947

UNITED STATES PATENT OFFICE.

HARRY S. DICKINSON, OF MOLINE, ILLINOIS, ASSIGNOR, BY MESNE ASSIGNMENTS, TO MOLINE PLOW COMPANY, INCORPORATED, OF MOLINE, ILLINOIS, A CORPORATION OF VIRGINIA.

TILLAGE IMPLEMENT.

Application filed December 9, 1919. Serial No. 343,674.

*To all whom it may concern:*

Be it known that I, HARRY S. DICKINSON, a citizen of the United States, residing at Moline, in the county of Rock Island and State of Illinois, have invented certain new and useful Improvements in Tillage Implements, of which the following is a specification.

This implement is designed primarily for use in connection with an unstable tractor of the general design shown in the Funk Patent No. 1,289,724, issued December 31, 1918, although the implement is not limited to use in connection with a tractor of this type.

The main object of the invention is to provide a machine in which the reaction of the unstable tractor is resisted by the supporting wheels and whereby the tillage elements are relieved from this reaction. The invention also pertains to the means whereby provision is made for permitting the carrying wheels to enter the furrow to the rear of the tillage elements without thereby disturbing the horizontal balance of the tractor, suitable connections being provided for affording compensation on account of the lowering of the carrying wheels as they enter the furrows.

The invention also pertains to the means provided for regulating the vertical elevation of the tillage elements and to the general structure and arrangement of these features in relation to the structure of the frame and supporting wheels; to the provision of gage wheels and means for effecting their vertical adjustment; to the means provided for securing the implement to the beam of an unstable tractor; and to the general structure and arrangement of the implement as a whole and to the various details thereof.

The implement as a whole comprises a frame consisting of side rails 3 which converge toward their front ends 4, which front ends are pivotally secured at the points 5 to a center subframe 6 comprising side rails 7 united at their rear ends by a cross bar 8. The subframe is provided at its front end with a bridge plate 9 spaced rearwardly a short distance behind the front end bar 10 of the frame to afford a horizontal pivotal connection between the subframe and a rearwardly extending beam 14 of a tractor, preferably of the unstable type, disclosed, for instance, in the Funk Patent No. 1,289,-724. This type of tractor is provided with a rearwardly extending beam 14 which is connected with vertical pivots 15 at its forward end to the body of a two-wheel tractor. Connections between the beam 14 and the front and rear aligned longitudinal pivots is afforded by means of front and rear hangers 16 depending from the beam and connecting with the respective pivot bolts so that the trailing implement will have a tilting connection with the beam, thereby permitting it to adapt itself more readily to inequalities in the ground surface.

The rear ends 17 of the side rails 3 composing the main frame are downwardly extended, as shown, and afford a mounting for the rear wheel shaft 18 upon which are journaled the primary supporting wheels 19, each of which is preferably of duplicate formation, comprising wheel sections 20 and 21 carried by hubs 22, each of which hubs projects in varying degree on opposite sides of the wheel section, so that the wheel sections can be mounted upon the shaft either with the long hub projections extending toward one another, as shown, in which case the wheel sections will be widely spaced, or with the short hub sections projecting toward one another, in which case the wheel sections will be held in much closer relation toward one another.

The wheels are located behind and in tracking relation with tillage elements 23, which in the form shown are lister bottoms, although other forms of soil working units may be employed. The tillage devices are carried at the rear down curving ends 24 of the beams 25, which beams at their forward ends are converged and vertically pivoted to a bracket 26, which in turn is horizontally pivoted within a selected hole 27 in a depending draft arm 28 downwardly extending from the yoke 29 which constitutes the front connecting portion of the tractor beam 14. This arrangement serves to impart the draft from the tractor directly to the tillage elements, the beam being relied upon to provide vertical stability to the tractor without serving as a draft element in any substantial degree.

Each of the tillage beams 25 is fitted for vertical adjustment to vary the depth of the tillage elements, which adjustment is effected in the following manner: A cross shaft 30 is journaled within hangers 31 carried by the side rails 3 of the main frame (and adapted to be rocked by a suitable adjusting means which in the specific form shown constitutes no portion of the present invention and need not be here described), and the shaft near each end is provided with a forwardly extending rigidly secured arm 32, each of which arms at its outer end has pivoted thereto an upstanding draw rod 33 which is entered through a bridge plate 34, which at a medial point connects the inner and outer bars 35 and 36 respectively of a pressure link 37, the rear ends of which bars are loosely pivoted upon the rock shaft 30 in position to straddle the intermediate arm 32. The upper end of the draw rod 33 carries a nut and washer 38 which contacts a spring 39 encircling the draw rod 33, the lower end of the spring bearing against the bridge plate 34, so that as the arm 32 is rocked downwardly it will exert a pull on the draw rod which extends freely through the bridge plate, which latter will receive the pressure at the lower end of the spring, thereby forcing down the forward free ends of the inner and outer arms 35 and 36 of the pressure link 37. The outer ends of the bars 35 and 36 are pivoted to the cross rod of a yoke 40, the lower ends of which are pivoted to an inward extension 41 of a depending axle 42 outturned at its lower end 43 to afford a journal mounting for a gage wheel 44.

In order to maintain the gage wheels in proper vertical relation to the tillage elements, an arm 45 is rigidly secured to the inner end of the axle extension 41, which arm carries a screw collar 46 which rides on the threaded end 47 connected to a hand adjusting rod 48 by means of a universal connection 49, the arrangement being such that as the adjusting rod is rotated the collar 46 will ride back and forth, thereby serving to adjust the gage wheels to the proper elevation. The above construction is duplicated on each side of the machine.

In order to maintain the tractor beam in substantially horizontal position irrespective of the depression of the main supporting wheels, which are intended to enter the furrow formed by the tillage elements, means are provided for varying the angularity between the main frame and the subframe, to which latter the tractor beam is horizontally pivotally secured, and these adjusting means will now be described.

Figure 4:
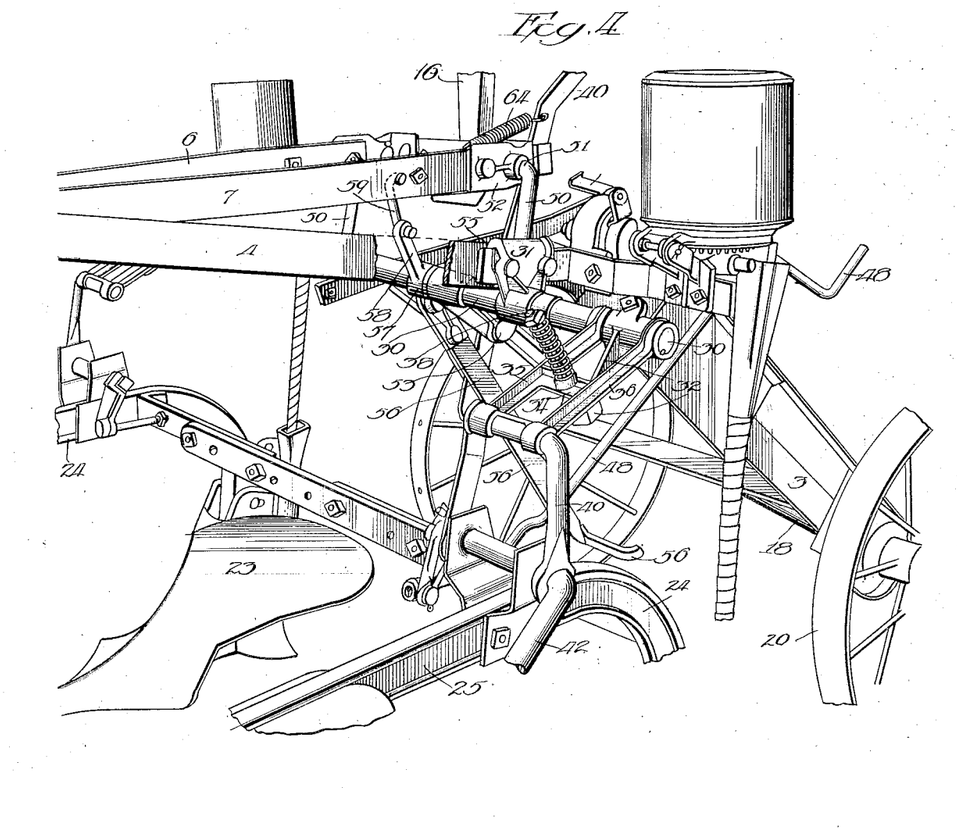
Fig. 4 is a perspective view showing the means for raising and lowering the tillage elements and the subframe to which the tractor beam is connected.

The front end of the subframe is pivoted to the main frame by the bolts 5 previously described, but the rear end is vertically adjustable with respect to the main frame, being supported by a pair of links 50, best shown in Fig. 4, the upper ends 51 of which are inturned and socketed within corner plates 52 on the subframe, the lower ends 53 of which are inturned and socketed into the ends of a pair of arms 54 rigidly secured to the shaft 30. The arms 54 extend at substantially right angles to the pressure link 37, so that as the shaft is turned in a clockwise direction to lift the pressure links in raising the tillage elements, the arms 54 will be lowered, thereby lowering the subframe to substantially the level of the main frame, with the result that, as the tillage elements rise from the ground and the furrows cease to be formed, the pressure wheels will roll up out of the furrows, thereby lifting the main frame with the subframe in lowered relation, so that the level of the tractor beam will be again established. In short, the lowering of the subframe should be in equal degree with the rise of the supporting wheels from the bottom of the furrow in order to compensate for the adjustment of the mechanisms.

Figure 1:
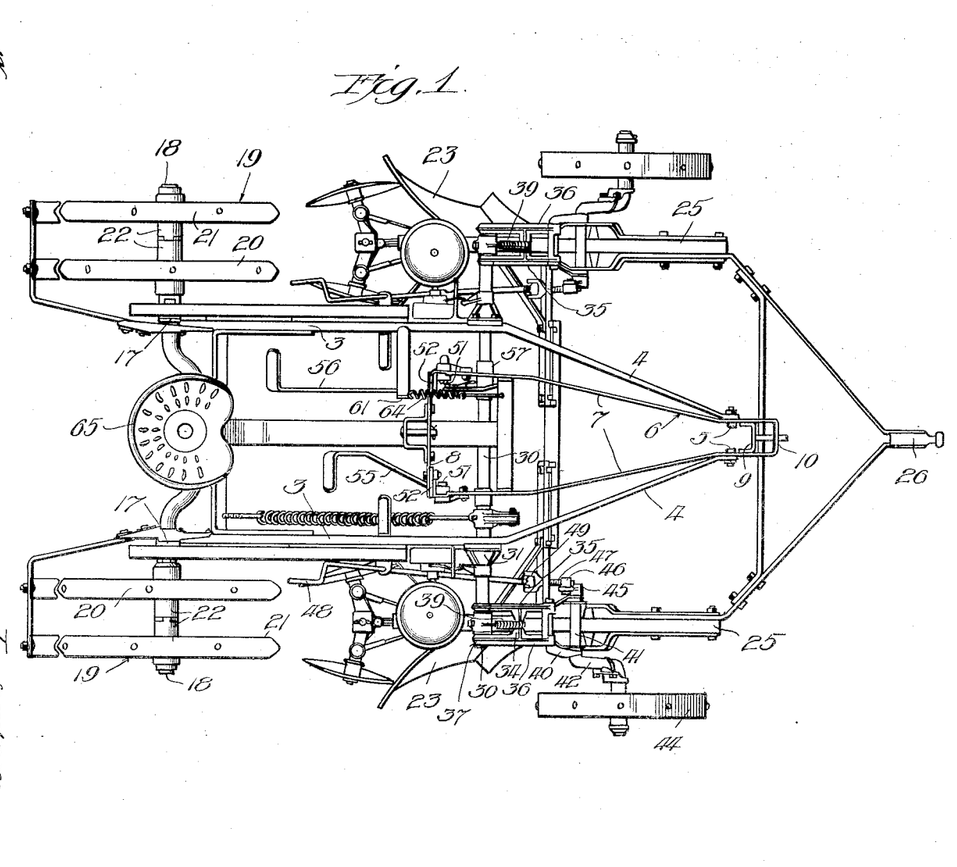
Figure 1 is a top or plan view of the implement of the present invention.
Figure 2:
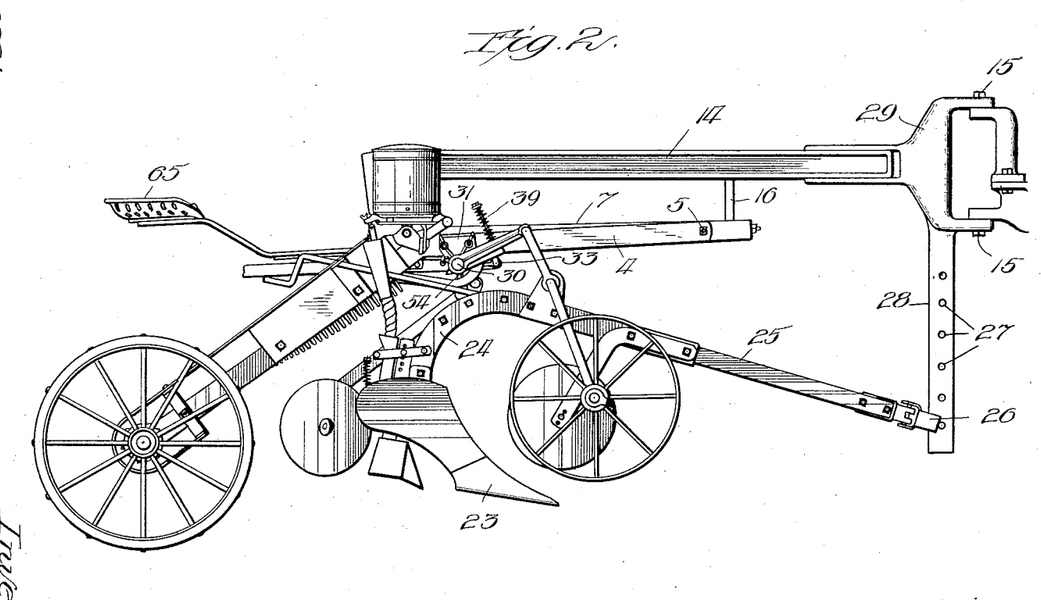
Fig. 2 is a side elevation of the same, showing the beam of an unstable two-wheel tractor of the general type shown in the Funk Patent No. 1,289,724.

The turning of the shaft in a clockwise direction is effected by means of a foot lever 55 which is rigidly secured to one of the arms 54 on the shaft 30 (being the right hand arm looking toward the front of the machine), and a depression of the foot lever 55 will effect the adjustments necessary to restore the subframe to the level of the main frame and lift the tillage elements from the soil, so that with the parts thus adjusted the implement can travel forward over level ground with the tillage elements suspended in the position indicated by Fig. 2.

In order to lower the tillage elements and the carrying wheels with relation to the subframe (or in other words to raise the subframe), a foot lever 56 is provided, which is loosely pivoted on the shaft 30 by means of a collar 57, and is provided with a forward extension 58, see Fig. 4, which in turn connects with a link 59 depending from the subframe. The depression of the foot lever 56 will, through the linkage shown, lift the rear end of the subframe with relation to the main frame, the collar 57 turning freely on the shaft 30, but this readjustment of the two frames will, through the connection afforded by the links 50 and arms 54, apparently effect a turning of the shaft 30 in a counter-clockwise direction, which results in swinging down the forwardly extending arms 32 which are rigid with the shaft, thereby exerting a down pull on the draw rods 33 and springs 39 which exert spring pressure on the pressure links and tend to force the tillage beams and tillage elements downwardly to start the furrows.

Figure 3:
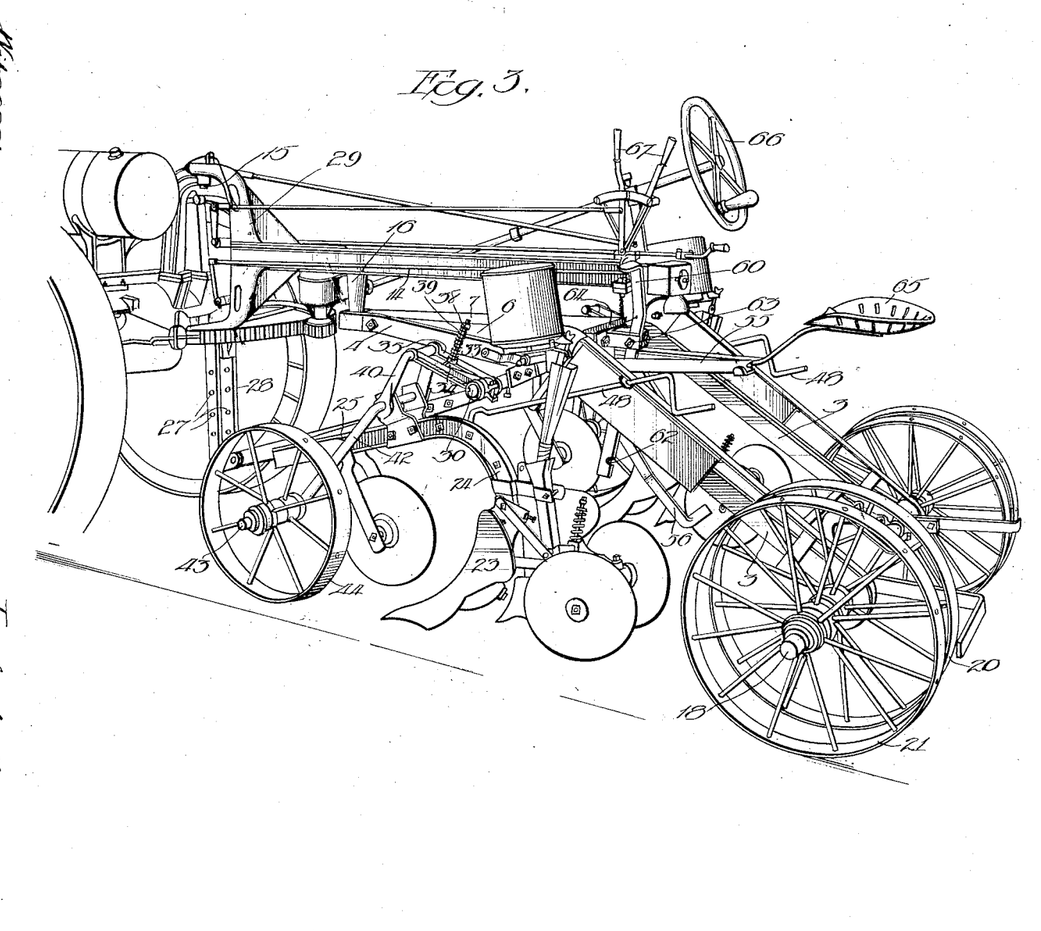
Fig. 3 is a quartering perspective view taken from the rear left hand side of the implement showing the same in associated relation with the tractor.

In order to maintain the foot lever 56 in either raised or lowered position a hand lever 60 is provided, see Fig. 3, which is pivoted to a clip 61 secured to the cross rail 8 of the subframe, and provided with upper and lower notches 62, one only of which is shown in Fig. 3. The foot lever 56 is provided with a pin or stud 63 adapted to be engaged by either one of the notches, and a spring 64 is secured to the upper end of the hand lever to hold any selected notch on the hand lever in engagement with the pin or stud of the foot lever. A seat 65 is provided in convenient relation to the steering wheel 66 and control levers 67 of the tractor, as well as in convenient relation to the foot levers on the trailing implement.

In the operation of the implement in traveling to and from a field or on a road, the tillage implements and gage wheels are lifted entirely clear of the ground, and the machine is transported as a four-wheel unit, the two wheels of the tractor being the forward guide and driving wheels, and the rear wheels of the unit the carrying or trailing wheels. When it is desired to employ the tillage elements, the hand lever is pulled backward against the spring and the upper notch therein moved away from the lock pin or stud on the right hand foot lever 56. By depressing the foot lever 56 the subframe is raised with respect to the main frame, thus raising the rear end of the tractor relative to the ground level and rotating the shaft 30 in a counter-clockwise direction (Figs. 3 and 4), which results in the lowering of the tillage elements and associated parts, including the gage wheels. The tillage elements enter the ground and begin to make furrows whose depth is determined by the adjustment of the gage wheels, which adjustment is effected by a turning of the hand adjusting rod 48, since the arms 32 rigidly secured to the outer ends of the shaft 30 have no power except as exerted through the springs 39, to force the tillage elements into the ground or hold them where when once they have entered.

As soon as the furrows begin to be formed the rear carrying wheels roll in the furrows, lowering themselves below the general level of the ground to the depth of the furrows, so that, simultaneously with the raising of the subframe and tractor beam, the furrows will begin to form, the carrying wheels will enter the furrows, and the original or normal level of the tractor beam will be reestablished and maintained, which is highly desirable in order to secure the best working position for the tractor.

In this particular class of machines it is the common practice to make furrows of substantially fixed depth, and for that reason, only the one lower notch in the hand lever is provided, but if it is desired to make furrows of various depths additional notches can be provided so that the desired depth of furrow can be obtained, the gage wheels being adjusted to the proper position to secure the desired depth of furrow and maintain the tractor beam in horizontal position. The downward reaction of the tractor is taken directly upon the subframe, and if the foot lever is securely locked in the lower notch of the hand adjusting lever, this reaction will be transmitted through the connection for the foot lever directly to the main frame and carried by the rear supporting wheels. The pressure links are freely mounted on the shaft 30 and the springs 39 may be adjusted to normally hold the tillage elements into the soil at a depth to be determined by the adjustment of the gage wheels. The practice in the seating of these parts is that the suction of the lister bottoms or other tillage elements is such that the bottoms will seek an equilibrium, being prevented from a tendency to plow deeper by the gage wheels, and being prevented from coming out of the ground or a tendency thereto by the pressure of the springs, which pressure may be increased or diminished according to variations in soil conditions.

When the end of the field is reached, the hand lever is operated to release the foot lever 56, which may thereafter be depressed to rotate the shaft 30, which effects a lowering of the subframe and a concurrent raising of the tillage elements, so that after this adjustment is effected the normal level of the tractor beam will be reestablished and the tillage elements held suspended above the ground level and in position to enable the implement to travel over level ground. In the construction shown the tillage elements comprise lister bottoms, subsoilers, and disk coverers, but other tillage devices may be substituted in lieu of those shown without affecting the general operation of the machine.

The rear carrying wheels are of a peculiar shape and are well adapted to press the soil upon the trench made by the subsoilers into which the seed has fallen. The wheel sections being mounted upon hubs which project unequally on opposite sides of each wheel section, the distance between the wheel sections may be varied, so that in use in soils where less pressure is required the wheel sections may be more widely spaced.

Although the invention has been described with considerable particularity as to details, it is obvious that various portions of the mechanisms may be changed or modified without departing from the spirit of the invention.

Thus in the claims employing the expression "An implement of the class described" it is not the intention to limit the invention to one employing lister bottoms for the purpose of working the soil, since obviously regular plow bottoms, cultivating units, or harvesting units might be substituted as occasion requires and without change in the general structure of the implement. In like manner, the form and general structure of the frame and subframe may be modified, and the use of the terms "main frame" and "subframe" are intended to cover the employment of any suitable structures so formed or proportioned and correlated as to subserve the functions ascribed to the elements mentioned.

I claim:

1. In an implement, the combination of a main frame, wheels supporting the main frame, a subframe pivoted to the main frame, means for connecting the subframe to an overlapping portion of a tractor, soil working units connected to the main frame, and means for concurrently lowering said units and raising the subframe with respect to the main frame, substantially as described.

2. In an implement, the combination of a main frame, a wheel supporting the main frame, a subframe pivoted to the main frame, means for connecting the subframe to an overlapping portion of a tractor, soil working units connected to the main frame, means for lowering said units with respect to the main frame, and means for raising the subframe with respect to the main frame, substantially as described.

3. In an implement, the combination of a main frame, a subframe pivoted to the main frame, means for connecting the subframe to an overlapping portion of a tractor, soil working units connected to the main frame, and means for concurrently lowering said units and raising the subframe with respect to the main frame, substantially as described.

4. In an implement of the class described, the combination of a main frame, a subframe adjustably connected to the main frame, means for connecting the subframe to an overlying portion of a tractor, tillage elements connected to the main frame, and means for concurrently lowering the tillage elements and raising the subframe with respect to the main frame, substantially as described.

5. In an implement of the class described, the combination of a main frame, a subframe adjustably connected to the main frame, means for connecting the subframe to an overlying portion of a tractor, tillage elements connected to the main frame, means for lowering the tillage elements with respect to the main frame, and means for raising the subframe with respect to the main frame, substantially as described.

6. In an implement of the class described, the combination of a main frame, a subframe pivoted at its forward end to the main frame, means for longitudinally pivoting the subframe to an overlying portion of a tractor, a tillage beam adapted to be secured to a lowdown portion of the tractor, tillage elements carried by the tillage beam, means for adjusting the vertical elevation of the tillage elements, and means for varying the vertical elevation between the subframe and the main frame, substantially as described.

7. In an implement of the class described, the combination of a main frame, wheels supporting the main frame, a subframe pivoted at its forward end to the main frame, means for longitudinally pivoting the subframe to an overlying portion of a tractor, a tillage beam adapted to be secured to a lowdown portion of the tractor, tillage elements carried by the tillage beam, means for adjusting the vertical elevation of the tillage elements, and means for varying the vertical elevation between the subframe and the main frame, substantially as described.

8. In an implement of the class described, the combination of a main frame, a subframe pivoted at its forward end to the main frame, means for longitudinally pivoting the subframe to an overlying portion of a tractor, a tillage beam adapted to be secured to a lowdown portin of the tractor, tillage elements carried by the tillage beam, and means for raising and lowering the subframe and concurrently lowering and raising the tillage elements in relation to the main frame, substantially as described.

9. In an implement of the class described, the combination of a main frame, wheels supporting the main frame, a subframe pivoted at its forward end to the main frame, means for longitudinally pivoting the subframe to an overlying portion of a tractor, a tillage beam adapted to be secured to a lowdown portion of the tractor, tillage elements carried by the tillage beam, and means for raising and lowering the subframe and concurrently lowering and raising the tillage elements in relation to the main frame, substantially as described.

10. In an implement of the class described, the combination of a main frame, supporting wheels at the rear end of the main frame in tracking relation with the tillage elements, a subframe pivoted at its forward end to the main frame, means for longitudinally pivoting the subframe to an overlying portion of a tractor, a tillage beam adapted to be secured to a lowdown portion of the tractor, tillage elements carried by the tillage beam, means for adjusting the vertical elevation of the tillage elements, and means for varying the vertical elevation between the subframe and the main frame, substantially as described.

11. In an implement of the class described, the combination of a main frame consisting of side rails connected at their forward ends and downwardly extending at their rear ends, supporting wheels journaled at the rear ends of the main frame, a subframe lying within the main frame and pivoted thereto at its forward end, means for longitudinally pivoting the subframe to an overlying portion of a tractor, a tillage beam located beneath the main and sub frames and adapted to connect at its forward end to a lowdown portion of a tractor, tillage elements carried by the tillage beam, and means for raising the rear end of the subframe and concurrently lowering the rear end of the tillage beam, substantially as described.

12. In an implement of the class described, the combination of a main frame consisting of side rails connected at their forward ends and downwardly extending at their rear ends, supporting wheels journaled at the rear ends of the main frame, a subframe lying within the main frame and pivoted thereto at its forward end, means for longitudinally pivoting the subframe to an overlying portion of a tractor, a tillage beam located beneath the main and sub frames and adapted to connect at its forward end to a lowdown portion of a tractor, tillage elements carried by the tillage beam and located forwardly of and in alignment with the supporting wheels, and means for raising the rear end of the subframe and concurrently lowering the rear end of the tillage beam, substantially as described.

13. In an implement of the class described, the combination of a main frame consisting of side rails connected at their forward ends and downwardly extending at their rear ends, supporting wheels journaled at the rear ends of the main frame, a subframe lying within the main frame and pivoted thereto at its forward end, means for longitudinally pivoting the subframe to an overlying portion of a tractor, a tillage beam located beneath the main and sub frames and adapted to connect at its forward end to a lowdown portion of a tractor, tillage elements carried by the tillage beam, a transverse rock shaft journaled to the main frame, means for rocking the shaft, connections between the shaft and the subframe, and connections between the shaft and the tillage elements for raising and lowering the subframe and concurrently lowering and raising the tillage elements with respect to the main frame, substantially as described.

14. In an implement of the class described, the combination of a main frame consisting of side rails connected at their forward ends and downwardly extending at their rear ends, supporting wheels journaled at the rear ends of the main frame, a subframe lying within the main frame and pivoted thereto at its forward end, means for longitudinally pivoting the subframe to an overlying portion of a tractor, a tillage beam located beneath the main and sub frames and adapted to connect at its forward end to a lowdown portion of a tractor, tillage elements carried by the tillage beam and located forwardly of and in alignment with the supporting wheels, a transverse rock shaft journaled to the main frame, means for rocking the shaft, connections between the shaft and the subframe, and connections between the shaft and the tillage elements for raising and lowering the subframe and concurrently lowering and raising the tillage elements with respect to the main frame, substantially as described.

15. In an implement of the class described, the combination of a main frame consisting of side rails connected at their forward ends and downwardly extending at their rear ends, supporting wheels journaled at the rear ends of the main frame, a subframe lying within the main frame and pivoted thereto at its forward end, means for longitudinally pivoting the subframe to an overlying portion of a tractor, a tillage beam located beneath the main and sub frames and adapted to connect at its forward end to a lowdown portion of a tractor, tillage elements carried by the tillage beam, a transverse rock shaft journaled to the main frame, arm and link connections between the rock shaft and the subframe, arm and link connections including spring elements between the rock shaft and the tillage elements, and means for rocking the shaft in opposite directions to raise and lower the subframe and concurrently lower and raise the tillage elements with relation to the main frame, substantially as described.

16. In an implement of the class described, the combination of a main frame consisting of side rails connected at their forward ends and downwardly extending at their rear ends, supporting wheels journaled at the rear ends of the main frame, a subframe lying within the main frame and pivoted thereto at its forward end, means for longitudinally pivoting the subframe to an overlying portion of a tractor, a tillage beam located beneath the main and sub frames and adapted to connect at its forward end to a lowdown portion of a tractor, tillage elements carried by the tillage beam and located forwardly of and in alignment with the supporting wheels, a transverse rock shaft journaled to the main frame, arm and link connections between the rock shaft and the subframe, arm and link connections including spring elements between the rock shaft and the tillage elements, and means for rocking the shaft in opposite directions to raise and lower the subframe and concurrently lower and raise the tillage elements with relation to the main frame, substantially as described.

17. In an implement of the class described, the combination of a main frame consisting of side rails connected at their forward ends and downwardly extending at their rear ends, supporting wheels journaled at the rear ends of the main frame, a subframe lying within the main frame and pivoted thereto at its forward end, means for longitudinally pivoting the subframe to an overlying portion of a tractor, a tillage beam located beneath the main and sub frames and adapted to connect at its forward end to a lowdown portion of a tractor, tillage elements carried by the tillage beam, means for raising the rear end of the subframe and concurrently lowering the rear end of the tillage beam, gage wheels carried by the tillage beam and vertically movable with the tillage elements, and means for vertically adjusting the wheels with relation to the tillage beam, substantially as described.

18. In an implement of the class described, the combination of a main frame consisting of side rails connected at their forward ends and downwardly extending at their rear ends, supporting wheels journaled at the rear ends of the main frame, a subframe lying within the main frame and pivoted thereto at its forward end, means for longitudinally pivoting the subframe to an overlying portion of a tractor, a tillage beam located beneath the main and sub frames and adapted to connect at its forward end to a lowdown portion of a tractor, tillage elements carried by the tillage beam and located forwardly of and in alignment with the supporting wheels, means for raising the rear end of the subframe and concurrently lowering the rear end of the tillage beam, gage wheels carried by the tillage beam and vertically movable with the tillage elements, and means for vertically adjusting the wheels with relation to the tillage beam, substantially as described.

19. In an implement of the class described, the combination of a main frame consisting of side rails connected at their forward ends and downwardly extending at their rear ends, supporting wheels journaled at the rear ends of the main frame, a subframe lying within the main frame and pivoted thereto at its forward end, means for longitudinally pivoting the subframe to an overlying portion of a tractor, a tillage beam located beneath the main and sub frames and adapted to connect at its forward end to a lowdown portion of a tractor, tillage elements carried by the tillage beam, a transverse rock shaft journaled to the main frame, means for rocking the shaft, connections between the shaft and the subframe, connections between the shaft and the tillage elements for raising and lowering the subframe and concurrently lowering and raising the tillage elements with respect to the main frame, gage wheels carried by the tillage beam and vertically movable with the tillage elements, and means for vertically adjusting the wheels with relation to the tillage beam, substantially as described.

20. In an implement of the class described, the combination of a main frame consisting of side rails connected at their forward ends and downwardly extending at their rear ends, supporting wheels journaled at the rear ends of the main frame, a subframe lying within the main frame and pivoted thereto at its forward end, means for longitudinally pivoting the subframe to an overlying portion of a tractor, a tillage beam located beneath the main and sub frames and adapted to connect at its forward end to a lowdown portion of a tractor, tillage elements carried by the tillage beam and located forwardly of and in alignment with the supporting wheels, a transverse rock shaft journaled to the main frame, means for rocking the shaft, connections between the shaft and the subframe, connections between the shaft and the tillage elements for raising and lowering the subframe and concurrently lowering and raising the tillage elements with respect to the main frame, gage wheels carried by the tillage beam and vertically movable with the tillage elements, and means for vertically adjusting the wheels with relation to the tillage beam, substantially as described.

21. In an implement of the class described, the combination of a main frame consisting of side rails connected at their forward ends and downwardly extending at their rear ends, supporting wheels journaled at the rear ends of the main frame, a subframe lying within the main frame and pivoted thereto at its forward end, means for longitudinally pivoting the subframe to an overlying portion of a tractor, a tillage beam located beneath the main and sub frames and adapted to connect at its forward end to a lowdown portion of a tractor, tillage elements carried by the tillage beam, a transverse rock shaft journaled to the main frame, arm and link connections between the rock shaft and the subframe, arm and link connections including spring elements between the rock shaft and the tillage elements, means for rocking the shaft in opposite directions to raise and lower the subframe and concurrently lower and raise the tillage elements with relation to the main frame, gage wheels carried by the tillage beam and vertically movable with the tillage elements, and means for vertically adjusting the wheels with relation to the tillage beam, substantially as described.

22. In an implement of the class described, the combination of a main frame consisting of side rails connected at their forward ends and downwardly extending at their rear ends, supporting wheels journaled at the rear ends of the main frame, a subframe lying within the main frame and pivoted thereto at its forward end, means for longitudinally pivoting the subframe to an overlying portion of a tractor, a tillage beam located beneath the main and sub frames and adapted to connect at its forward end to a lowdown portion of a tractor, tillage elements carried by the tillage beam and located forwardly of and in alignment with the supporting wheels, a transverse rock shaft journaled to the main frame, arm and link connections between the rock shaft and the subframe, arm and link connections including spring elements between the rock shaft and the tillage elements, means for rocking the shaft in opposite direction to raise and lower the subframe and concurrently lower and raise the tillage elements with relation to the main frame, gage wheels carried by the tillage beam and vertically movable with the tillage elements, and means for vertically adjusting the wheels with relation to the tillage beam, substantially as described.

23. The combination with a tractor having a rearwardly extending coupling frame of an implement having supporting wheels and tillage tools adjustable vertically independently of the supporting wheels, and mechanism associated with the implement and connected to the coupling frame arranged to move said frame upwardly when the implements are lowered to working position.

24. The combination with a front wheel drive tractor having a rearwardly extending coupling frame, of a tillage implement connected to said frame, tillage tools carried by the implement, wheels for supporting the implement traveling in the path of operation of the tillage tools so that the height of the wheels varies depending upon whether or not the tillage tools are in operation, means for moving the tillage tools into and out of working position independently of the supporting wheels, and means for automatically maintaining the tractor level as the tools are changed from working to nonworking position and vice versa while the implement is being drawn.

25. The combination with a tractor having a rearwardly extending coupling frame of an implement having supporting wheels arranged to travel behind and in the track of tillage tools carried by said implement, means for raising and lowering said tools, and mechanism associated with said raising and lowering means and connected to the tractor frame for raising said frame when the tillage tools are lowered to thereby compensate for the downward movement of the implement supporting wheels caused by the entering of said wheels into the path of operation of the tillage tools.

26. The combination with a two-wheeled tractor of the unstable type having a rearwardly extending coupling frame, of an implement connected to said frame to constitute with the tractor a stablized unit, said implement having supporting wheels arranged to travel in the path of operation of tillage tools carried by the implement, means moving said tools into and out of working position, and mechanism for maintaining said tractor level when the implement is being drawn with the tools in working position and when being drawn with the tools out of working position.

HARRY S. DICKINSON.